(12) United States Patent
Bartsch et al.

(10) Patent No.: US 10,385,420 B2
(45) Date of Patent: Aug. 20, 2019

(54) PURIFICATION OF COPPER CONCENTRATE BY REMOVAL OF ARSENIC AND ANTIMONY WITH CONCOMITANT REGENERATION AND RECYCLE OF LIXIVIANT

(71) Applicants: Alchemides Pty Ltd, Mile End, South Australia (AU); Hydromet (Pty) Ltd., Rowhill, Springs (ZA); Promet101 Consulting Pty Ltd, Helensvale, Queensland (AU)

(72) Inventors: Peter John Bartsch, Mile End (AU); Grenvil Dunn, East Perth (AU); Stuart Saich, Santiago (CL)

(73) Assignees: Alchemides Pty Ltd, Mile End (AU); Hydromet (Pty) Ltd, Rowhill, Springs (ZA); Promet 101 Consulting Pty Ltd, Helensvale (AU)

( * ) Notice: Subject to any disclaimer, the term of this patent is extended or adjusted under 35 U.S.C. 154(b) by 499 days.

(21) Appl. No.: 15/129,687

(22) PCT Filed: Mar. 27, 2015

(86) PCT No.: PCT/AU2015/000188
§ 371 (c)(1),
(2) Date: Sep. 27, 2016

(87) PCT Pub. No.: WO2015/149111
PCT Pub. Date: Oct. 8, 2015

(65) Prior Publication Data
US 2017/0145540 A1    May 25, 2017

(30) Foreign Application Priority Data
Mar. 30, 2014  (AU) .............................. 2014901135

(51) Int. Cl.
C22B 3/12 (2006.01)
C22B 3/44 (2006.01)
(Continued)

(52) U.S. Cl.
CPC .................. *C22B 3/44* (2013.01); *C22B 3/12* (2013.01); *C22B 15/0008* (2013.01);
(Continued)

(58) Field of Classification Search
CPC ....... C22B 15/0008; C22B 3/12; C22B 30/04; C22B 15/0065; C22B 15/0089; C22B 30/02; C22B 3/44; Y02P 10/212
See application file for complete search history.

(56) References Cited

U.S. PATENT DOCUMENTS 3,709,680 A    1/1973  Holmes et al.
3,911,078 A   10/1975  Nadkarni et al.
(Continued)

FOREIGN PATENT DOCUMENTS

AU    2011318234    4/2012

OTHER PUBLICATIONS

Anderson, et al., "The Alkaline Sulfide Hydrometallurgical Separation, Recovery and Fixation of Tin, Arsenic, Antimony, Mercury and Gold", The Southern African Institute of Mining and Metallurgy Lead and Zinc 2008, pp. 121-132.
(Continued)

*Primary Examiner* — Daniel C. McCracken
(74) *Attorney, Agent, or Firm* — Hamre, Schumann, Mueller & Larson, P.C.

(57) ABSTRACT

A hydrometallurgical process for the removal of arsenic and antimony from a so-called "dirty" copper concentrate (101) is described. The process comprises the following steps: Step 1: repulping (100) the "dirty" copper concentrate with an alkaline lixiviant (102, 103), and subjecting the "dirty"
(Continued)

copper concentrate to an alkaline leaching process ("the Leach") in a Leach reactor (110). The arsenic and antimony are dissolved in the Leach to produce a "clean" copper concentrate (138) and leach discharge liquor (132). Step 2: subjecting the Leach discharge liquor (132) to a lime treatment step (151) in order to regenerate (150) the alkaline lixiviant as well as precipitate an impurity rich precipitate (161) containing arsenic and antimony. Then the impurity rich precipitate (161) is separated (160) from the regenerated alkaline lixiviant (162). The impurity rich precipitate is washed and disposed of in an environmentally safe condition. Step 3: recycling the regenerated alkaline lixiviant (162) to the Leach in Step 1, and so employing the recycled alkaline lixiviant (102) in the further extraction of arsenic and antimony from incoming "dirty" copper concentrate (101).

25 Claims, 2 Drawing Sheets

(51) Int. Cl.
  *C22B 15/00* (2006.01)
  *C22B 30/02* (2006.01)
  *C22B 30/04* (2006.01)

(52) U.S. Cl.
  CPC ...... *C22B 15/0065* (2013.01); *C22B 15/0089* (2013.01); *C22B 30/02* (2013.01); *C22B 30/04* (2013.01); *Y02P 10/212* (2015.11)

(56) References Cited

U.S. PATENT DOCUMENTS

| | | | | |
|---|---|---|---|---|
| 4,029,741 | A | * | 6/1977 | Coltrinari ............ C01G 30/002 423/179 |
| 2014/0017152 | A1 | * | 1/2014 | Nako ........................ C22B 3/44 423/1 |

OTHER PUBLICATIONS

Shibayama, et al., "Removal of Arsenic in Enargite from Copper Ores by Flotation and Leaching in NaHS Media", XXV International Mineral Processing congress (IMPC) 2010 Proceedings, Sep. 2010, pp. 1603-1611.

Long, et al., "A review of copper-arsenic mineral removal from copper concentrates", Minerals Engineering 36-38, 2012, pp. 179-186.

\* cited by examiner

PURIFICATION OF COPPER CONCENTRATE BY REMOVAL OF ARSENIC AND ANTIMONY WITH CONCOMITANT REGENERATION AND RECYCLE OF LIXIVIANT

FIELD OF THE INVENTION

The present invention relates to a hydrometallurgical process for the removal of impurity elements including arsenic and antimony from a "dirty" copper concentrate and relates particularly, though not exclusively, to such a process in which an alkaline (caustic/hydroxide) lixiviant is regenerated and recycled.

BACKGROUND TO THE INVENTION

The dominant copper-containing minerals in most copper sulfide deposits are chalcopyrite, cubanite and bornite. Chalcocite and, in some cases, covelite may also be present in ores and recovered into concentrates. The gangue minerals includes sulfides, sometimes have pyrite and pyrrohotite, along with lesser quantities of host rock or gangue silicate minerals report to the final flotation concentrate. Impurity elements such as arsenic and antimony may also be contained in these minerals, or additionally as energite, tennantite and tetrahedrite, which classifies the concentrates as "dirty" with respect to smelting of the concentrates. Such "dirty" concentrates may have penalties imposed by purchasers, or be rejected for treatment.

High-grade copper sulfide concentrates (typically greater than about 25% Cu) are commonly treated by pyrometallurgical routes, whereas hydrometallurgical routes are generally favoured for the lower-grade copper concentrates and "dirty" concentrates. The economically and technically most favourable processing route can also be influenced by the concentration of minor metals such as cobalt and nickel, valuable metals such as silver, gold, palladium and platinum, as well as deleterious metals such as arsenic and antimony, present in the feed material. Hydrometallurgical processing routes are generally more energy consuming than smelting.

The three dominant pyrometallurgical routes for high-grade copper sulfide concentrates are smelting to a matte followed by converting to blister copper, direct to blister smelting and roasting. The efficiency of the smelting technology is determined by, amongst other things, the Cu/S ratio and the concentration of slag forming components, especially iron, magnesium and silica. Conventional smelting processes are generally not applicable to lower grade or dirty copper concentrates. Not all of the copper content of the original feed is recovered as blister copper, the remaining copper reporting to the slag and to the smelter dusts or fumes recovered from the smelter off-gases. Impurity elements such as arsenic in the feed concentrate can contaminate the smelted copper and increase costs of refining, and may accumulate in smelter dusts and so present occupational hygiene hazards.

Roasting of copper concentrates requires the conversion of the copper content to a water-soluble or sulfate form, which is recovered from the roaster calcine by leaching, followed by solvent extraction and electrowinning. Roasting is often inefficient because copper-containing insoluble ferrite phases can form during the roasting stage and lock some copper and valuable by-products such as cobalt. Impurity elements such as arsenic in the feed concentrate to roasters can follow the vent gasses, or report to separate dust stream which is costly to treat or dispose.

Many hydrometallurgical processes have been proposed for treating copper-containing concentrates. Few of the proposed processes have attained full-scale commercial development. Most hydrometallurgical processes for the recovery of copper from copper concentrates struggle to compete economically against pyrometallurgical steps such as smelting. There are a number of reasons for this including the cost of power, effective control of impurity elements in treated concentrate, problems of effluent treatment or disposal, and difficulty in precious metal recovery.

The recovery of copper from chalcopyrite-containing copper concentrate that also contains appreciable arsenic, i.e. greater than 0.5%, or other pnictogen impurity content is problematic. High temperatures (and pressures) are required to efficiently solubilise the copper during hydrometallurgical treatment. Whilst most of the arsenic will report to the residue, small quantities will co-report with the copper to the leachate. The recovery of the soluble copper from the leachate requires a solvent extraction circuit, and an electrowinning step, that add to the capital and operating costs.

The dirty copper concentrate can be treated by known hydrometallurgical technologies. The descriptions of processes which remove arsenic and other impurity metals from dirty concentrates, and so produce relatively clean concentrates, are referred to in U.S. Pat. No. 3,709,680 Holmes and Coltrinari, and U.S. Pat. No. 3,911,073 Nadkarni, Kusin and Heissner, and Australian Patent No AU 2011318324 Nakon and Way.

The descriptions of processes which involve alkaline leaching, particularly for removal of arsenic or recovery of antimony, are widely published. Recent literature describes various processes e.g. C. Anderson, L. Twidwell, 2008. *The Alkaline Sulfide Hydrometallurgical Separation, Recovery And Fixation Of Tin, Arsenic, Antimony, Mercury And Gold*, The Southern African Institute of Mining and Metallurgy, Conf, Lead and Zinc 2008; A Shibayama, etal, 2010. *Removal Of Arsenic In Enargite From Copper Ores By Flotation And Leaching In NaHS Media*, XXV International Mineral Processing Congress Proceedings, Brisbane. G Long, Y Peng, D Bradshaw. 2012. *A review of copper-arsenic mineral removal from copper concentrates*, Minerals Engineering 36-38 (2012) 179-186.

The flow-sheets disclosed in these patent specifications and process descriptions contain several deficiencies or inefficiencies, such as:

a) additional dosing of costly sodium or sodium-based reagents; sodium sulphide (NaS), or sodium hydrosulphide (NaHS) and hence recovering, recycling, controlling or discarding expensive reagents;

b) completely oxidised arsenic in the form of arsenate which tends to carry sodium, and so results in a loss of expensive reagent;

c) incomplete extraction of the arsenic and antimony from the copper concentrate and so the concentrate attracts penalties from purchasers;

d) potential loss of precious metals from the concentrate following their dissolution in the strong caustic sulphide leach liquors; and, e) the pnictogenic elements such as arsenic and antimony may not be disposed into environmentally acceptable stream or condition, and so the final destination or treatment route of residues and effluents may be problematic.

The present invention was developed with a view to providing a hydrometallurgical process for the removal of impurity elements including arsenic and antimony from a "dirty" copper concentrate that is less susceptible to the above deficiencies which otherwise limit or penalise the processing of the concentrate in a smelter. The process substantially relieves the inefficiencies by advantageously regenerating the leach liquors, thus economising sodium-based reagent inputs. Advantageously the process also precipitates arsenic and antimony into a separate disposable stream.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a hydrometallurgical process for the removal of arsenic and antimony from a so-called "dirty" copper concentrate which may also contain precious metals, the process including the steps of:

Step 1: repulping the "dirty" copper concentrate with an alkaline lixiviant and subjecting the "dirty" copper concentrate containing arsenic and antimony to an alkaline leaching process, hereafter termed "the Leach", and so dissolving the arsenic and antimony, to produce an arsenic depleted concentrate and a Leach discharge liquor;

Step 2: subjecting the Leach discharge liquor to a partial oxidation and lime treatment step in order to regenerate the alkaline lixiviant as well as precipitation of a low-sodium, impurity rich precipitate containing arsenic and antimony, and then separating the impurity rich precipitate from the regenerated alkaline lixiviant, and washing and disposing of the impurity rich precipitate in an environmentally safe condition; and, Step 3: recycling the regenerated alkaline lixiviant to the Leach in Step 1, and so employing the recycled alkaline lixiviant in the further extraction of arsenic and antimony from incoming "dirty" copper concentrate.

Preferably the Leach is conducted with heated slurry containing the "dirty" concentrate and at least one of the minerals selected from the group consisting of chalcopyrite, cubanite, bornite, covelite, chalcocite, together with impurity bearing minerals which contain arsenic or antimony, such as enargite, tennantite and/or tetrahedrite.

Preferably the Leach is a pressure leach in which sodium hydroxide is present in the alkaline lixiviant at a concentration of between 20 to 200 grams per liter for arsenic and antimony. More preferably the sodium hydroxide is present at a concentration of between 80 and 150 grams per liter. Preferably the sodium hydroxide in the alkaline lixiviant is regenerated in Step 2 of the process, recovered and concentrated in Step 3, and recycled to Step 1.

Preferably the step of repulping the "dirty" copper concentrate with an alkaline lixiviant in Step 1 includes adding a supplementary or make-up dosage of sodium hydroxide. Typically arsenic and antimony are extracted from the "dirty" copper concentrate in the Leach of Step 1 by the sodium hydroxide lixiviant.

Preferably the "dirty" copper concentrate is repulped with recycled alkaline lixiviant to feed the Leach with slurry having a concentration in the range of 10 to 50% solids (mass/mass). Preferably the particle size of the feed "dirty" concentrate is below 250 micron. Preferably the Leach is conducted under anaerobic conditions, i.e. without overpressure of air or oxygen. Preferably the Leach is conducted at temperatures in excess of 100° C. and below 250° C.

Preferably a discharge from the Leach is cooled or flashed to produce Leach discharge slurry and steam vapour. Preferably the steam from cooling the Leach discharge is employed to preheat the feed 'dirty' copper concentrate slurry. Preferably the Leach discharge slurry is thickened by decantation, and/or filtered, and then washed with water to remove a significant portion of the entrained liquor as washate. Preferably the Leach discharge residue after washing is a 'clean' copper concentrate, which is prepared for shipment to a smelter where the copper, precious metals and sulfur values are recovered.

Preferably the Leach discharge stream from a thickener overflow is clarified. Preferably the clarified Leach discharge liquor is treated with air or oxygen in the partial oxidation and lime treatment step to partially oxidise the solute. Preferably the partial oxidation is conducted at a temperature above 10° C. and typically below 200° C. More preferably the partial oxidation is conducted at a temperature above 10° C. and typically below 110° C. Preferably the partially oxidised solution is treated with fresh slaked lime, lime slurry, or milk of lime to precipitate a majority of the arsenic and antimony. Alternatively quick lime or hydrated lime can be added as a powder. Preferably the arsenic and antimony precipitation step is typically conducted at temperatures above 30° C. and below 110° C. Preferably the freshly slaked lime, lime slurry, or milk of lime is at a concentration typically above 10% and below 30% solids, (mass/mass).

Preferably the impurity rich precipitate is separated from the regenerated alkaline lixiviant, washed with suitable process water and then treated or discarded to a suitably designed tailings facility or co-disposed of in an environmentally responsible manner, if permitted, with concentrator tailings. Preferably the regenerated alkaline lixiviant, after lime treatment and separation from the impurity rich precipitate, along with any wash fluids is recovered in Step 3 and recycled to Step 1.

Optionally, the impurity rich precipitate derived from the lime treatment step can be treated with an acidic iron containing liquor to convert the calcium arsenic compound into scorodite or a similar compound.

Advantageously the regenerated liquor which is separated from the lime treatment Step 2 is near quantitatively recovered in both the filtrate and the washate.

Preferably the recovered liquor after lime treatment is evaporated and recycled to Step 1 where the regenerated sodium hydroxide is employed in the Leach. Advantageously the recovered washate is optimally evaporated along with the post lime treatment washate.

In an alternative embodiment, the Leach Is a first stage alkaline leaching process (hereinafter "the First Leach") and the arsenic depleted concentrate from the First Leach is advanced to a second stage alkaline leaching process (hereinafter "the Second Leach") in Step 3. Preferably the regenerated alkaline lixiviant from Step 2 after separation is collected in a surge facility and then fed to a second stage leach make-up. Advantageously the partially oxidised solution is treated with lime to regenerate the alkaline lixiviant in Step 2, and then blended with a partially arsenic depleted concentrate from a first stage thickener underflow in a correct ratio in the second stage leach make-up.

According to another aspect of the present invention there is provided a hydrometallurgical process for the removal of arsenic and antimony from a so-called "dirty" copper concentrate which may also contain precious metals, the process including the steps of:

Step 1: repulping the "dirty" copper concentrate with an alkaline lixiviant, and subjecting the "dirty" copper concentrate containing arsenic and antimony to a first alkaline leaching process, hereafter termed "the First Leach", to produce a partially arsenic depleted concentrate and a First Leach discharge liquor;

Step 2: subjecting the First Leach discharge liquor to a partial oxidation and lime treatment step in order to regenerate the alkaline lixiviant as well as precipitate an impurity rich precipitate containing arsenic and antimony, and then separating the impurity rich precipitate from the regenerated alkaline lixiviant, and washing and disposing of the impurity rich precipitate in an environmentally safe condition; and, Step 3: employing the regenerated alkaline lixiviant from Step 2 for leaching the partially arsenic depleted concentrate from Step 1 in a second alkaline leaching process, hereafter termed "the Second Leach" to produce an arsenic depleted concentrate and a Second Leach discharge liquor, and treating the Second Leach discharge liquor to recover regenerated lixiviant which is then recycled to the First Leach in Step 1, and so employing the recycled lixiviant in the further extraction of arsenic and antimony from incoming "dirty" copper concentrate.

In the event that the arsenic and antimony are present in the arsenic containing concentrate as enargite, tennantite, tetrahedrite, or like minerals, or are present as impurity elements in chalcopyrite, cubanite, bornite, covelite, chalcocite, then preferably the First Leach is an Atmospheric Leach in which caustic liquor, including sodium hydroxide, comprises the lixiviant for arsenic and antimony.

Preferably sodium hydroxide is regenerated and produced in Step 2 of the process, and advanced to Step 3 to adjust the hydroxide concentration ratio, and then fed to Step 1.

New sodium hydroxide, or optionally instead or as well as another caustic bearing reagent, can be employed to supplement the regenerated lixiviant components from Step 3.

Preferably arsenic and antimony are extracted from the arsenic containing concentrate in Step 3 by the regenerated sodium hydroxide based liquor.

Preferably the arsenic containing concentrate is repulped with the regenerated lixiviant from Step 3 to feed the Atmospheric Leach in the range of 50-60% solids (mass/mass).

Preferably the particle size of the feed arsenic containing concentrate is below 250 micron.

Preferably the Atmospheric Leach is conducted under anaerobic conditions, i.e. without over-pressure of air or oxygen.

Preferably the Atmospheric Leach is conducted at temperatures in excess of 10° C. and below 110° C.

Preferably the Atmospheric Leach is conducted at temperatures below the boiling point of the caustic liquor.

Preferably the arsenic containing concentrate entering the Atmospheric Leach is conducted with heated slurry containing at least one of the minerals selected from the group consisting of chalcopyrite, cubanite, bornite, covelite, chalcocite, etc. together with impurity bearing minerals which contain arsenic, bismuth or antimony.

Preferably the Atmospheric Leach discharge liquor is thickened to produce a thickener overflow liquor and a thickener underflow slurry.

Preferably steam from cooling the Second Leach discharge liquor is employed to preheat the arsenic containing feed copper concentrate.

Preferably, the Atmospheric Leach thickener overflow liquor is clarified to remove any mis-reporting copper concentrate.

Preferably, the Atmospheric Leach thickener overflow liquor and/or filtrate is treated to precipitate arsenic and antimony in Step 2.

Preferably, the Atmospheric Leach thickener underflow slurry is advanced to the Second Leach.

Preferably the clarified Atmospheric Leach discharge liquor is treated with air or oxygen in an oxidation process to partially oxidise the solute. Preferably the oxidation process is conducted at a temperature above 10° C. and typically below 200° C.

Preferably the partially oxidized overflow liquor is treated with quick lime or freshly slaked lime slurry, or milk of lime, or alternatively quick lime or hydrated lime powder to precipitate a majority of the arsenic and antimony and to regenerate sodium hydroxide.

Preferably the sodium hydroxide regeneration and arsenic and antimony precipitation process is conducted at temperatures above 30° C. and typically below 110° C.

Preferably the freshly slaked lime slurry or milk of lime is above 30° C. and at concentration above 30% solids, (mass/mass). Alternatively quick lime or hydrated lime is added as a dry powder.

Preferably the precipitate is separated from the treated liquor and then discarded to a suitable designed tailings facility or co-disposed with the concentrator tailings, or optionally in another environmentally responsible manner.

Preferably, the arsenic and antimony containing precipitate is washed with water to recover the solutes.

Preferably a solution fraction after lime treatment is employed in Step 3 and then recycled to Step 1.

Preferably the solution fraction recovered from the lime treatment step (in Step 2) is employed to make up slurry of the Atmospheric Leach thickener underflow slurry.

Preferably the Second Leach employs regenerated or internally generated sodium hydroxide.

Preferably, the Second Leach is conducted at temperatures in excess of 100° C. and below 250° C.

Preferably, the Second Leach discharge liquor is cooled or flashed to produce a leached slurry and steam vapor.

Preferably steam from cooling the Second Leach discharge liquor is employed to preheat a concentrate repulp circuit which feeds Step 1.

Preferably the cooled Second Leach discharge slurry is thickened by decantation and/or filtered and then washed with water to remove a significant fraction of the entrained liquor and sodium based solute.

Preferably the washed arsenic depleted concentrate is prepared for shipment to a smelter where the copper and sulfur values are recovered.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of preferred embodiments of the hydrometallurgical process for the removal of impurity elements including arsenic and antimony from copper concentrate, given by way of example only, with reference to the accompanying drawings, in which.

DETAILED DESCRIPTION OF PREFERRED EMBODIMENTS

A first embodiment of a hydrometallurgical process in accordance with the invention, for the removal of impurity elements including arsenic and antimony from copper concentrate, as illustrated in the process flow-sheet of FIG. 1, preferably comprises three steps as follows:

Step 1: treatment of a "dirty" copper concentrate containing arsenic and antimony by an alkaline leaching process ("the Leach") with a sodium or potassium hydroxide based alkaline lixiviant;

Step 2: regeneration of the alkaline lixiviant by partial oxidation of a discharge liquor from the Leach, employing air or oxygen or any other suitable oxidant, and precipitating of the arsenic and antimony by lime treatment and removal as a solid waste product for storage in a Tailing Facility or co-deposition with flotation tailings; and, Step 3: recovery of the alkaline lixiviant by evaporation, or other concentration process, and recycling of the alkaline lixiviant to be further employed in the Leach of Step 1.

Figure 1:
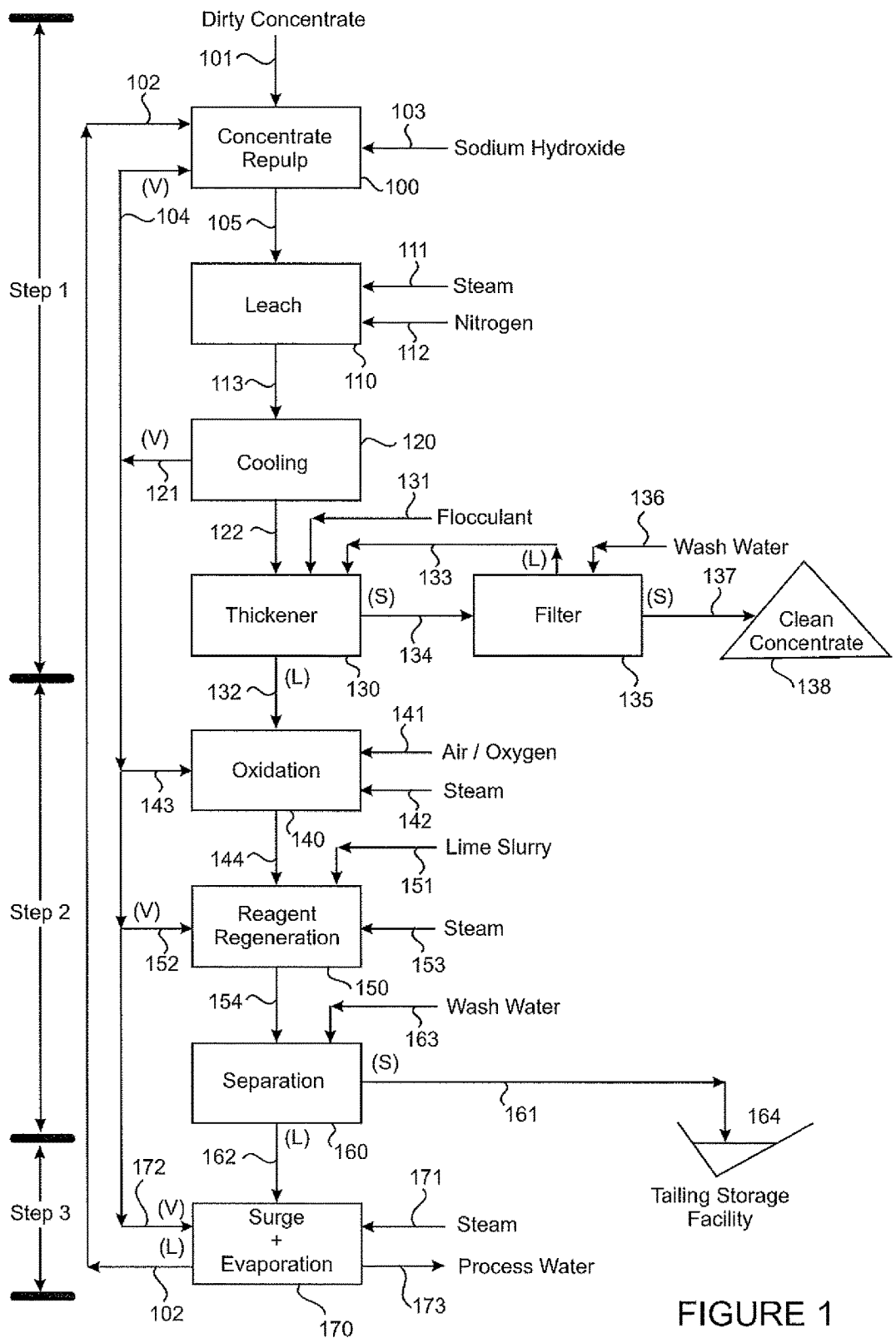
FIG. 1 shows a process flow-sheet for a first embodiment of the hydrometallurgical process for the removal of Impurity elements according to the present Invention; and, FIG. 2 shows a process flow-sheet for a second embodiment of the hydrometallurgical process for the removal of impurity elements according to the present invention.

The following description of the preferred embodiment of the present invention is given with reference to the process flow-sheet in FIG. 1.

Step 1

The "dirty" copper flotation concentrate [101] containing primary and or secondary copper sulfides, iron sulfides, arsenic and antimony minerals is repulped [100] in an alkaline lixiviant [103] together with a recycled reagent [102]. Typically the concentrate contains copper sulfide minerals including chalcopyrite, covelite, bornite, chalcocite, cubanite, as well as impurity bearing minerals enargite, tetrahedrite, tennanite. As may be required from time to time fresh sodium and or potassium hydroxide [103] is supplemented to the slurry during repulping [100].

Preferably the repulped slurry is preheated with recycled steam [104]. The solids content of the repulped slurry [105] is varied by adjusting the flow and concentration of the reagent in the recycle stream [102]. The preheated slurry [105] is then pumped into a Leach reactor [110] where it is subject to the Leach. Preferably sodium hydroxide concentrations between 20 and 200 g/L are employed in the Leach [110]. More typically a concentration between 80 and 150 g/L is adequate to achieve an acceptable residual arsenic and antimony in the clean concentrate.

In the Leach reactor [110] the temperature is further adjusted with direct steam injection [111]. Temperatures are preferably maintained between 110° C. and 250C. Typically a temperature of 200 to 220° C. is adequate for the efficient removal of the arsenic and antimony from the dirty concentrate. Preferably the particle size of the feed "dirty" concentrate is below 250 micron. The Leach is typically conducted under anaerobic conditions, i.e. without over-pressure of air or oxygen. A retention time of between 0.1 and 6 hours is preferably required in the Leach. Typically a retention time of 0.3 hour is generally sufficient to achieve acceptable residual arsenic values in the "clean" concentrate. The Leach reactor [110] typically operates at its vapour pressure. However nitrogen partial pressures of between 10 and 50 kPa may be employed, if required for process control.

The slurry [113] from the Leach reactor is preferably cooled in a flash tank [120] from which flash steam [121] and cooled slurry [122] are discharged. The flash steam [121] can be scrubbed and then employed to preheat [104] the dirty copper concentrate feed. Excess flash steam can be released to atmosphere or employed elsewhere in the flow-sheet for heating, as in reagent regeneration [150] or evaporation [170].

The cooled slurry [122] can be further cooled and then thickened by decantation [130]. Flocculant solution [131] and recycle filtrate [133] and internal solution recycles are employed to aid slurry thickening. The thickener overflow [132] can be further clarified before recovering and regenerating the lixiviant.

The thickened slurry [134] is filtered [135] and a "clean" copper concentrate [138] is first washed with water [136] and then stored for sale [137].

Step 2

The thickener over-flow solution [132], with or without clarification, is preheated to between 30° C. and 110° C. employing flash steam [143] or new steam [142]. The heated liquor is reacted with air or oxygen [141] in an oxidation vessel [140] or in a pipeline. Alternately another type of oxidant such as ozone or hydrogen peroxide can be employed. The retention time in the oxidation step is preferably between 0.1 and 10 hours. Typically a retention time of 0.25 hours is adequate to oxidise the liquor to a form in which arsenic is readily precipitated.

The partially oxidised arsenic liquor [144] is fed to the Reagent Regeneration step [150]. Slaked or dry lime slurry [151], or milk of lime, or alternatively lime or hydrated lime powder, is reacted with the partially oxidised impurity-containing solution [144] to regenerate the alkaline lixiviant in an agitated vessel [150], and so precipitate arsenic and other impurities. A majority of the arsenic and antimony are precipitated by reaction with the lime compounds, and report to the regeneration step discharge stream [154]. The retention time required to precipitate the arsenic and antimony is preferably between 0.1 and 4 hours. The reaction is typically completed within 15 minutes to ½ hour. The regeneration step has an exceptionally short retention time.

A solids fraction [161] in the discharge slurry [154] is separated from an aqueous fraction [162] in a separator [160] by known technology. This separator [160] can be any one or a combination of thickener, filter, centrifuge, etc. The solids fraction [161] is washed with water [163] to flush out as much of the lixiviant as economically feasible, and then the solid fraction is disposed of in an environmentally responsible manner to the tailings facility [164] or co-disposed with flotation tailings. Control of the solute bleed from the circuit, within the moist solids to the tailings facility, limits the concentration of unwanted or deleterious anions and cations in the recycle reagent stream.

After separation [160] the regenerated lixiviant [162] is collected in a surge facility and/or is discharged to evaporation in Step 3 [170].

Step 3

The regenerated lixiviant [162], together with the wash liquors derived from wash water [163] can be combined and restored to the concentration of the alkali lixiviant employed in the Leach [110]. Alternatively the wash liquor containing the alkali reagent can be evaporated independently of the more concentrated regenerated lixiviant and recombined prior to the concentrate repulp step [100].

The combined liquor stream [162] or the wash liquor component is evaporated employing new steam [171] or recycle flash steam [172], if available. Typically the evaporator [170] is a multiple effect unit, (hence the employment of new steam [171] or recycle steam [172]), or a vapour recompression unit. The condensate recovered from the evaporator [170] can be employed as process water [173] for washing solids [136] and [163] or in flocculant make-up [131].

The concentrated regenerated liquor stream [102] discharges from the evaporator [170] is employed in the dirty concentrate repulp [100].

The process of the invention is further illustrated with the following examples:

Example 1

A South American arsenic and antimony containing concentrate was processed according to Step 1. The concentrate grade is given below:

|    | %    |
|----|------|
| Cu | 45.6 |
| Fe | 12.8 |
| S  | 31.4 |
| As | 4.1  |
| Sb | 0.29 |

The sodium hydroxide concentration in the Leach step was 96 g/L. The operating temperature of the Leach reactor was 180° C. The concentration of arsenic and antimony in the Leach residue was:

|    | After 1 hour % | After 2 hours % |
|----|----------------|-----------------|
| As | 0.24           | 0.12            |
| Sb | 0.09           | 0.08            |

The composition of the Leachate after 1 hour was:

|    | g/L  |
|----|------|
| As | 14.1 |
| Sb | 0.79 |
| Na | 52   |

The Step 1 Leachate was treated with lime slurry at 100° C. and the composition of the Step 2 regenerated liquor was:

|    | After 1 hour g/L | After 4 hours g/L |
|----|------------------|-------------------|
| As | 2.7              | 1.4               |
| Sb | 0.48             | 0.08              |
| Ca | 0.01             | 0.01              |

The lime dose was 45 kg/tonne of dirty concentrate feed to Step 1.

The arsenic and sulfur composition of the Step 2 residue was:

|    | %    |
|----|------|
| As | 26   |
| S  | 0.33 |

Example 2

A South American arsenic and antimony containing concentrate was processed according to Step 1. The concentrate grade analysis was:

|    | %     |
|----|-------|
| Cu | 26.4  |
| Fe | 25    |
| S  | 32.9  |
| Si | 2.3   |
| As | 1.82  |
| Sb | 0.094 |
| Al | 1.08  |

The regenerated Feed liquor analysis after recycle from a previous flow-sheet cycle was:

|    | g/L   |
|----|-------|
| Na | 119   |
| As | 1.22  |
| Sb | 0.14  |
| Al | 0.10  |
| Ca | 0.275 |
| Si | 0.3   |

This liquor was blended with the incoming concentrate and diluted to a sodium hydroxide liquor of 120 g/L.

The Leach was conducted at 200° C. under anaerobic conditions with a solid density of 30%

|    |   | After 10 minutes | After 20 minutes | After 30 minutes |
|----|---|------------------|------------------|------------------|
| Cu | % | 26.9             | 26.5             | 26.0             |
| S  | % | 32.0             | 30.7             | 31.0             |
| Si | % | 2.10             | 2.10             | 1.7              |
| As | % | 0.20             | 0.14             | 0.12             |
| Sb | % | 0.025            | 0.026            | 0.021            |

The Leachate values were:

|    |     | After 10 minutes | After 20 minutes |
|----|-----|------------------|------------------|
| As | g/L | 10.1             | 10.4             |
| Sb | g/L | 0.37             | 0.38             |

The Leachate was split into two fractions and the first fraction was treated with: oxygen gas at 95° C. and 1000 kPa(g) in an equivalent of a pipe line reactor for 10 minutes, and then treated with lime slurry to precipitate the arsenic and antimony.

The above treatment restored the sodium hydroxide concentration and had the following impurity element composition:

|    | g/L   |
|----|-------|
| Al | 0.014 |
| As | 0.086 |
| Sb | 0.013 |
| Si | 0.011 |
| Ca | 0.040 |

The second fraction of the Leachate was treated with: air at 95° C. and 1000 kPa(g) in the equivalent of a pipe line reactor for 10 minutes, and then with lime slurry to precipitate the arsenic and antimony The above treatment was not as effective as oxygen in the oxidation of the arsenic leachate. The sodium hydroxide concentration was restored and the impurity element composition was:

|    | g/L   |
|----|-------|
| Al | 0.012 |
| As | 0.204 |
| Sb | 0.010 |
| Si | N/A   |
| Ca | 0.055 |

Figure 2:
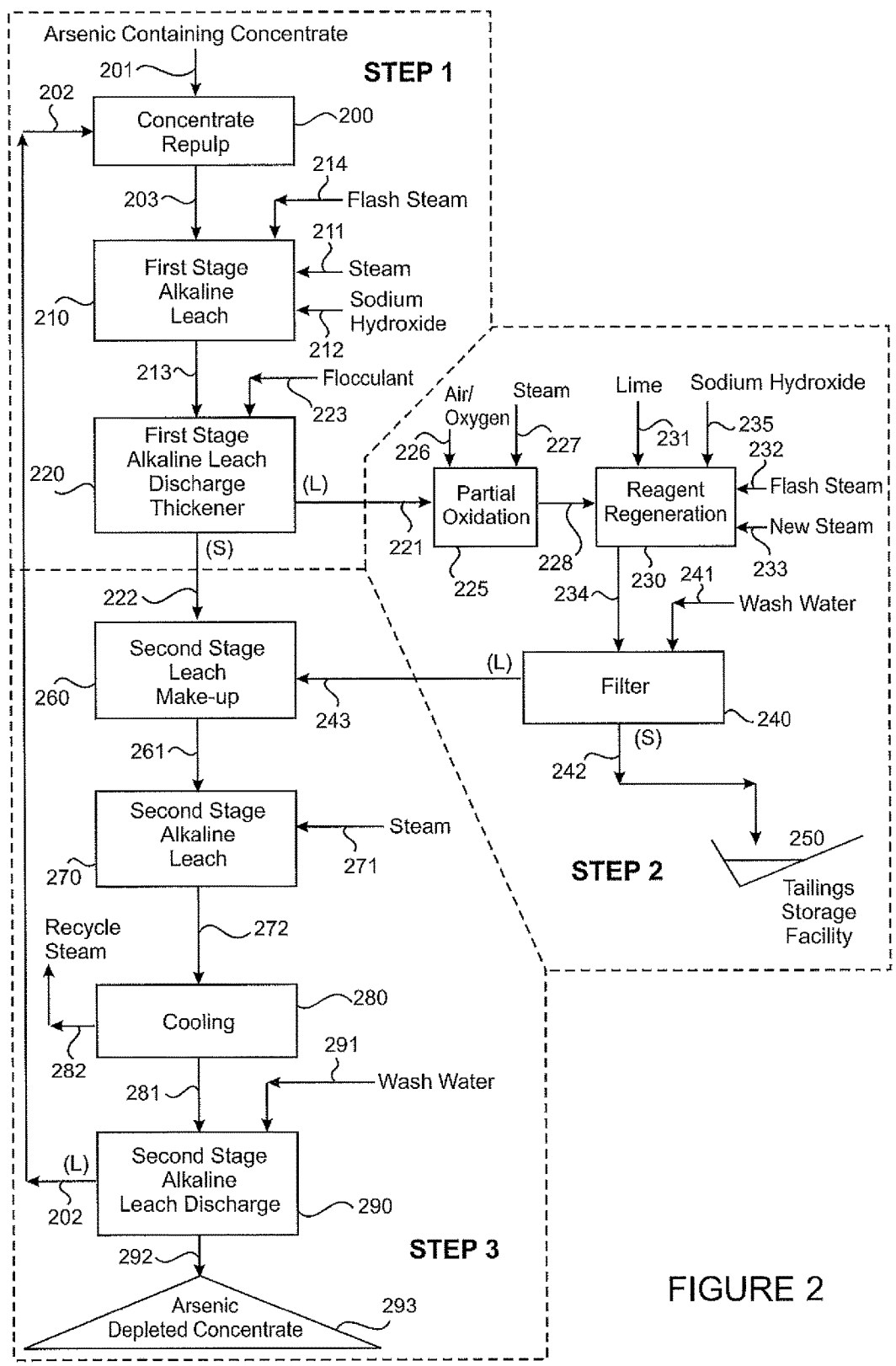

A second embodiment of a hydrometallurgical process in accordance with the invention, for the removal of impurity elements including arsenic and antimony from copper concentrate, is illustrated in the process flow-sheet of FIG. 2. The process illustrated in FIG. 2 preferably comprises three steps as follows:

Step 1: treatment of a "dirty" copper concentrate containing arsenic and antimony by a first stage alkaline leaching process ("the First Leach") with a sodium or potassium hydroxide based alkaline lixiviant to produce a partially arsenic depleted concentrate;

Step 2: regeneration of the alkaline lixiviant by partial oxidation of a discharge liquor from the First Leach, employing air or oxygen or any other suitable oxidant, and precipitating of the arsenic and antimony by lime treatment and removal as a solid waste product for storage in a Tailing Facility or co-deposition with flotation tailings; and, Step 3: treatment of partially arsenic depleted concentrate from Step 1 by a second stage alkaline leaching process ("the Second Leach") with the regenerated alkaline lixiviant from Step 2 to produce an arsenic depleted concentrate, and recovery and recycling of the alkaline lixiviant to be further employed in the First Leach of Step 1.

The following description of the second embodiment of the present invention is given with reference to the process flow-sheet in FIG. 2.

Step 1

The arsenic containing concentrate [201] containing primary and or secondary copper sulfides, iron sulfides, arsenic and antimony minerals is repulped [200] in a blend of regenerated lixiviant [202]: Typically the concentrate [201] contains copper sulfide minerals include chalcopyrite, covelite, bornite, chalcocite, cubanite, as well as impurity bearing minerals which contain arsenic, bismuth or antimony, such as enargite, tetrahedrite, tennanite.

Typically the alkaline lixiviant blend is caustic liquor, preferably containing sodium hydroxide in ratios as required for leaching arsenic and antimony. Preferably sodium hydroxide is regenerated and produced in Step 2 of the process, and advanced to Step 3 to adjust the hydroxide concentration ratio, and then fed to Step 1.

The repulped slurry [203] is fed to a First Stage Alkaline Leach [210] ("the First Leach"). New sodium hydroxide [212], or optionally instead or as well as another caustic bearing reagent, can be employed to supplement the regenerated lixiviant components from Step 3 during leaching [210]. The solids content of the repulped slurry [203] is varied by adjusting the concentration of the regenerated hydroxide between 20-200 g/L, preferably between 80-150 g/L, in recycled lixiviant stream [202].

Preferably the solids content of the repulped slurry [203] is in the range of 50-60% solids (mass/mass). Preferably the particle size of the feed arsenic containing concentrate is below 250 micron.

Preferably the First Leach is an Atmospheric Leach conducted under anaerobic conditions, i.e. without overpressure of air or oxygen.

In the First Leach reactor [210] the repulped slurry is agitated and the temperature is further adjusted with flash steam [214] or new direct or indirect steam [211]. Temperatures are preferably maintained between 10° C. and 110° C. Typically a temperature below the boiling point of the caustic liquor is adequate for the removal of a significant proportion of the arsenic and antimony from the arsenic containing concentrate.

A leach retention time of between 0.1 and 12 hours is required. Typically a retention time of 4-6 hours is generally sufficient to deplete the concentrations and achieve acceptable residual arsenic values in the First Stage Leach residue.

The Leach reactor operates at its vapour pressure, however, a nitrogen blanket may be employed, if required.

The First Leach discharge stream [213] is preferably cooled and thickened by decantation in a thickener [220] to produce a thickener overflow liquor [221] and a thickener underflow slurry [222]. Flocculant solution [223] and internal solution recycles are employed to aid slurry thickening. The thickener overflow liquor [221] can be further clarified before recovering and regenerating the lixiviant.

The thickener underflow slurry [222], containing the arsenic depleted concentrate, is advanced to a Second Stage Leach make-up step [260].

Step 2

The thickener overflow liquor [221] with or without clarification is treated with air or oxygen [226] in an oxidation process [225] to partially oxidise the solute. Preferably the oxidation process is conducted at a temperature above 10° C. and typically below 200° C. Typically steam [227] is used to heat the liquor. Following partial oxidation the thickener overflow liquor [228] is preferably preheated to between 30° C. and 110° C. employing flash steam [232] and or new steam [233] in a reagent regeneration step [230].

Slaked lime slurry or milk of lime [231] is reacted with the thickener overflow solution [228] in agitated vessels [230] to precipitate arsenic and other impurities and to regenerate sodium hydroxide. Preferably the freshly slaked lime slurry or milk of lime is above 30° C. and at a concentration between 10% and 30% solids, (mass/mass). Alternatively quick lime or hydrated lime added as a dry powder may be used. A majority of the arsenic and antimony are precipitated by reaction with the lime slurry and report to the regeneration discharge stream [234]. The retention time required to precipitate the arsenic and antimony is between 0.1 and 4 hours and the reaction is typically complete within ½ an hour. Preferably this liquor regeneration and arsenic and antimony precipitation process is conducted at temperatures above 30° C. and typically below 110° C.

The solids fraction [242] in the regeneration discharge slurry [234] is separated from the aqueous fraction [243] in a separator [240] employing known technology. This separator [240] can be any one or a combination of thickener, filter, centrifuge, etc. The solids fraction [242] is washed with water [241] to flush out as much of the regenerated reagent as economically feasible and then disposed of in an environmentally responsible manner to the tailings facility

[250] or co-disposed with flotation tailings. Control of the solute bleed from the circuit, within the moist solids to the tailings facility, limits the concentration of unwanted or deleterious anions and cations in the recycle reagent stream.

The regenerated liquor [243] after separation [240] is collected in a surge facility, dewatered and evaporated as required, and fed to the second stage leach make-up [260].

Step 3

The regenerated sodium hydroxide in stream [243] and the First Leach discharge thickener underflow [222] are blended in the correct ratio in a Second Stage Leach Make-Up [260]. The make-up slurry [261] is fed to a Second Stage Alkaline Leach [270] ("the Second Leach") to further lower the arsenic and antimony content of the concentrate [222].

The Second Leach reactor [270] is an agitated vessel and the temperature is further adjusted with steam [271]. Temperatures in the Second Leach are preferably maintained between 100° C. and 250° C. Typically a temperature of 110° C. to 180° C. is adequate for removal of impurities.

The retention time to treat the concentrate is between 0.1 and 6 hours. Typically a retention time of 1 to 3 hours is generally sufficient to achieve an adequate lowering of arsenic and antimony in the concentrate.

The Second Leach discharge stream [272] is preferably cooled in a flash tank [280] where steam [282] and slurry [281] are discharged. The flash steam [282] can be scrubbed and then recycled to preheat [214] the arsenic containing copper concentrate feed. Excess flash steam is released to atmosphere or employed elsewhere in the flow-sheet for heating as in the reagent regeneration step [232].

The cooled slurry [281] can be further cooled and then filtered in a filter [290] or similar unit to produce a residue [292] and a filtrate [202]. The filtered residue [292] can be washed in the filter [290] employing wash water [291] or repulped and further washed in a similar manner to remove the interstitial reagent in the arsenic depleted concentrate [239] to acceptable levels.

The filtrate stream [202] containing the regenerated lixiviant is recycled to the concentrate repulp step [200] where it is employed to leach arsenic and antimony from newly fed arsenic containing concentrate [201] in the leach reactor [210].

The regenerated reagents are thus expended in the First Leach reactor [210] in the removal of arsenic and antimony, and then regenerated in the Reagent Regeneration Step [230] and partly expended in the Second Leach [270] and recycled to remove arsenic and antimony from arsenic containing concentrates.

The arsenic and antimony are precipitated by lime in the sodium hydroxide regeneration step [230] and removed from the process to a tailings storage facility [250]. Filter wash water that is employed in the process is removed, as required, employing an evaporative process.

The principle reagent consumed in this process is lime and small quantities of sodium hydroxide [235] may be required as "top-up" in the Reagent Regeneration Step [230] or new sodium hydroxide in the First Leach [210].

The process of the invention is further illustrated with the following example:

Example 3

The Chilean concentrate employed in this test was the same as that in Example 1:

|    | %    |
|----|------|
| Cu | 45.6 |
| Fe | 12.8 |
| S  | 31.4 |
| As | 4.1  |
| Sb | 0.29 |

The concentrate was repulped at 30% solids in a Second Stage Alkaline Leach liquor (stream [202]) and subjected to a First Stage Alkaline Leach (step [210]) at just over 100° C. for 3 hours. The composition of the leachate [221] from this step was:

|    | g/L  |
|----|------|
| As | 19   |
| Sb | 1.1  |

This leachate [221] was treated in the Reagent Regeneration Step [230] employing lime (but no sodium carbonate).

The Reagent Regeneration Step employed a specific lime dose of 14 kg CaO equivalent per cubic meter of feed liquor and an operating temperature of 100° C.

The composition of the regenerated liquor [243] before evaporative concentration was:

|    | g/L  |
|----|------|
| As | 1.76 |
| Sb | 0.41 |
| Na | 30.1 |

This liquor was boiled down to produce a lixiviant concentration of 50 g/L Na at which point it was blended with the partially leached concentrate [222] from the First Stage Alkaline Leach [210] and subjected to a Second Stage Alkaline Leach (step [270]). The Second Stage Alkaline Leach (step [270]) was operated at 180° C. for 2 hours under anaerobic conditions.

The leach slurry was cooled, filtered and washed, and the residue [292] analysed.

|    | %    |
|----|------|
| Cu | 45   |
| Fe | 12.6 |
| S  | 29.8 |
| As | 0.21 |
| Sb | 0.06 |

The leachate stream [202] was returned to the Concentrate Repulp Step [200]. The above analysis confirms an arsenic removal of approximately 95%.

Now that preferred embodiments of the hydrometallurgical process for the removal of impurity elements including arsenic and antimony from arsenic containing copper concentrate have been described in detail, it will be apparent that the described embodiments provide a number of advantages over the prior art, including the following:

(i) Regeneration and recycling of the alkaline lixiviant provides substantial cost savings in the reagents used for repulping and subsequent leaching of the "dirty" copper concentrate;

(ii) Precipitation of the arsenic as calcium compounds with minimal loss of sodium into the waste or clean concentrate;

(iii) Complete extraction of the arsenic and antimony from the copper concentrate and disposal in an environmentally acceptable manner;
(iv) The major reagent input is lime or its slurried form, and therefore the input of expensive caustic soda is proportionally minimised;
(v) A single stage or two stage leach process employing caustic or sodium hydroxide solution, or regenerated sodium hydroxide liquor as the dominant lixiviant;
(vi) Recycling of the flash steam to preheat the "dirty" copper concentrate and/or elsewhere in the process for heating during reagent regeneration or evaporation also provides significant reductions in operating costs.

It will be readily apparent to persons skilled in the relevant arts that various modifications and improvements may be made to the foregoing embodiments, in addition to those already described, without departing from the basic inventive concepts of the present invention. For example, there may be substantial variation in the process variables, such as temperature, pressure and retention times, from that described. Therefore, it will be appreciated that the scope of the invention is not limited to the specific embodiments described and is to be determined from the appended claims.

The invention claimed is:

1. A hydrometallurgical process for the removal of arsenic and antimony from a "dirty" copper concentrate which may also contain precious metals, the process comprising the steps of:
   Step 1: repulping the "dirty" copper concentrate with an alkaline lixiviant, and subjecting the "dirty" copper concentrate containing arsenic and antimony to an alkaline leaching process, hereafter termed "the Leach", and so dissolving the arsenic and antimony, to produce an arsenic depleted concentrate and a Leach discharge liquor;
   Step 2: subjecting the Leach discharge liquor to a partial oxidation and lime treatment step in order to regenerate the alkaline lixiviant as well as precipitation of a low-sodium, impurity rich precipitate containing arsenic and antimony, and then separating the impurity rich precipitate from the regenerated alkaline lixiviant, and washing and disposing of the impurity rich precipitate in an environmentally safe condition; and,
   Step 3: recycling the regenerated alkaline lixiviant to the Leach in Step 1, and so employing the recycled alkaline lixiviant in the further extraction of arsenic and antimony from incoming "dirty" copper concentrate.

2. A hydrometallurgical process as defined in claim 1, wherein the Leach is conducted with heated slurry containing the "dirty" copper concentrate and at least one of the minerals selected from the group consisting of chalcopyrite, cubanite, bornite, covelite, chalcocite, together with impurity bearing minerals which contain arsenic or antimony, such as enargite, tennantite and/or tetrahedrite.

3. A hydrometallurgical process as defined in claim 2, wherein the Leach is a pressure leach in which sodium hydroxide is present at a concentration of between 20 and 200 grams per liter in the alkaline lixiviant for arsenic and antimony.

4. A hydrometallurgical process as defined in claim 3, wherein the sodium hydroxide is present at a concentration of between 80 and 150 grams per liter.

5. A hydrometallurgical process as defined in claim 3, wherein the sodium hydroxide in the alkaline lixiviant is regenerated in Step 2 of the process, recovered and concentrated in Step 3, and recycled to Step 1.

6. A hydrometallurgical process as defined in claim 1, wherein the step of repulping the "dirty" copper concentrate with an alkaline lixiviant in Step 1 includes adding a supplementary or make-up dosage of sodium hydroxide.

7. A hydrometallurgical process as defined in claim 6, wherein arsenic and antimony are extracted from the "dirty" copper concentrate in the Leach of Step 1 by the sodium hydroxide lixiviant.

8. A hydrometallurgical process as defined in claim 1, wherein the "dirty" copper concentrate is repulped with recycled alkaline lixiviant to feed the Leach with slurry having a concentration in the range of 10 to 50% solids (mass/mass).

9. A hydrometallurgical process as defined in claim 1, wherein the particle size of the feed "dirty" concentrate is below 250 micron.

10. A hydrometallurgical process as defined in claim 1, wherein the Leach is conducted under anaerobic conditions without over-pressure of air or oxygen.

11. A hydrometallurgical process as defined in claim 1, wherein the Leach is conducted at temperatures in excess of 100° C. and below 250° C.

12. A hydrometallurgical process as defined in claim 11, wherein a discharge from the Leach is cooled or flashed to produce Leach discharge slurry and steam vapour.

13. A hydrometallurgical process as defined in claim 12, wherein the Leach discharge slurry is thickened by decantation, and/or filtered, and then washed with water to remove a significant portion of the entrained liquor as washate.

14. A hydrometallurgical process as defined in claim 13, wherein the Leach discharge residue after washing is the 'clean' copper concentrate, which is prepared for shipment to a smelter where the copper, precious metals and sulfur values are recovered.

15. A hydrometallurgical process as defined in claim 13, wherein the Leach discharge stream from a thickener overflow is clarified and the clarified Leach discharge liquor is treated with air or oxygen in an oxidation process to partially oxidise the solute.

16. A hydrometallurgical process as defined in claim 15, wherein the oxidation process is conducted at a temperature above 10° C. and below 200° C.

17. A hydrometallurgical process as defined in claim 16, wherein the oxidation process is conducted at a temperature above 10° C. and below 110° C.

18. A hydrometallurgical process as defined in claim 15, wherein the partially oxidised solution is treated with fresh slaked lime, lime slurry, or milk of lime to precipitate a majority of the arsenic and antimony.

19. A hydrometallurgical process as defined in claim 1, wherein the impurity rich precipitate is separated from the regenerated alkaline lixiviant, washed with suitable process water and then treated or discarded to a suitably designed tailings facility or co-disposed of in an environmentally responsible manner, if permitted, with concentrator tailings.

20. A hydrometallurgical process as defined in claim 19, wherein the regenerated alkaline lixiviant, after lime treatment and separation from the impurity rich precipitate, along with any wash fluids is recovered in Step 3 and recycled to Step 1.

21. A hydrometallurgical process as defined in claim 20, wherein the impurity rich precipitate derived from the lime treatment step is treated with an acidic iron containing liquor to convert the calcium arsenic compound into scorodite or a similar compound.

22. A hydrometallurgical process as defined in claim 1, wherein the Leach is a first stage alkaline leaching process (hereinafter "the First Leach") and the arsenic depleted concentrate from the First Leach is advanced to a second stage alkaline leaching process (hereinafter "the Second Leach") in Step 3.

23. A hydrometallurgical process as defined in claim 22, wherein the regenerated alkaline lixiviant from Step 2 after separation is collected in a surge facility and then fed to a second stage leach make-up.

24. A hydrometallurgical process for the removal of arsenic and antimony from a "dirty" copper concentrate which may also contain comprising precious metals, the process including the steps of:
   Step 1: repulping the "dirty" copper concentrate with an alkaline lixiviant, and subjecting the "dirty" copper concentrate containing arsenic and antimony to a first alkaline leaching process, hereafter termed "the First Leach", to produce a partially arsenic depleted concentrate and a First Leach discharge liquor;
   Step 2: subjecting the First Leach discharge liquor to a partial oxidation and lime treatment step in order to regenerate the alkaline lixiviant as well as precipitate an impurity rich precipitate containing arsenic and antimony, and then separating the impurity rich precipitate from the regenerated alkaline lixiviant, and washing and disposing of the impurity rich precipitate in an environmentally safe condition; and,
   Step 3: employing the regenerated alkaline lixiviant from Step 2 for leaching the partially arsenic depleted concentrate from Step 1 in a second alkaline leaching process, hereafter termed "the Second Leach" to produce an arsenic depleted concentrate and a Second Leach discharge liquor which is then recycled to the First Leach in Step 1, and so employing the recycled lixiviant in the further extraction of arsenic and antimony from incoming "dirty" copper concentrate.

25. A hydrometallurgical process as defined in claim 24, wherein in the event that the arsenic and antimony are present in the arsenic containing concentrate as enargite, tennantite, tetrahedrite, or like minerals, or are present as impurity elements in chalcopyrite, cubanite, bornite, covelite, chalcocite, then the First Leach is an Atmospheric Leach in which caustic liquor, including sodium hydroxide, comprises the lixiviant for arsenic and antimony.

* * * * *